United States Patent
Bai et al.

(10) Patent No.: US 10,581,861 B2
(45) Date of Patent: Mar. 3, 2020

(54) ENDPOINT ACCESS MANAGER

(71) Applicant: International Business Machines Corporation, Armonk, NY (US)

(72) Inventors: Yunfei Bai, Singapore (SG); Ken Yian Chow, Singapore (SG); Christopher Hockings, Burleigh Waters (AU); Guoguang Jason Lu, Singapore (SG); Codur S. Pranam, London (GB); Roy Soumyajit, Singapore (SG); Chuxin Zhao, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 15/701,564

(22) Filed: Sep. 12, 2017

(65) Prior Publication Data
US 2019/0081953 A1    Mar. 14, 2019

(51) Int. Cl.
*H04L 29/06* (2006.01)
*H04L 12/24* (2006.01)
*H04W 12/10* (2009.01)
*H04W 12/06* (2009.01)

(52) U.S. Cl.
CPC ........ *H04L 63/102* (2013.01); *H04L 41/0893* (2013.01); *H04L 63/0823* (2013.01); *H04L 63/20* (2013.01); *H04W 12/0609* (2019.01); *H04W 12/1008* (2019.01)

(58) Field of Classification Search
CPC ... H04L 63/102; H04L 63/0823; H04L 63/20; H04L 41/0893; H04W 12/1008; H04W 12/0609
See application file for complete search history.

(56) References Cited

U.S. PATENT DOCUMENTS

| | | | | |
|---|---|---|---|---|
| 7,562,386 B2* | 7/2009 | Balissat | ............. | H04L 63/0272 726/15 |
| 7,814,535 B1* | 10/2010 | Barile | ................. | H04L 63/1433 726/5 |
| 8,689,300 B2* | 4/2014 | Sims | .................... | H04L 63/0823 713/154 |
| 8,739,258 B2 | 5/2014 | Alnas et al. | | |
| 8,756,651 B2 | 6/2014 | Baer et al. | | |
| 9,210,140 B2* | 12/2015 | Pope | ..................... | G06F 21/572 |
| 9,288,199 B1 | 3/2016 | Winn et al. | | |
| 9,923,903 B2* | 3/2018 | Kopp | .................. | H04L 41/0809 |
| 2003/0100297 A1* | 5/2003 | Riordan | .................... | G06F 8/60 455/418 |

(Continued)

*Primary Examiner* — Mahfuzur Rahman
(74) *Attorney, Agent, or Firm* — Edward J. Wixted, III (57) ABSTRACT

Aspects of the present invention disclose a method, computer program product, and system for determining whether an endpoint meets compliance standards. The method includes one or more processors receiving an endpoint certificate associated with an endpoint device that is requesting to access a resource, wherein the endpoint certificate includes a device fingerprint. The method further includes one or more processors determining compliance level of the endpoint device. The method further includes one or more processors validating credentials of the endpoint device. The method further includes one or more processors determining whether the endpoint device meets compliance standards based on the endpoint certificate, the determined compliance level, and the credentials of the endpoint device.

12 Claims, 3 Drawing Sheets

(56) References Cited

U.S. PATENT DOCUMENTS

| | | | |
|---|---|---|---|
| 2003/0200172 A1* | 10/2003 | Randle | G06Q 20/04 |
| | | | 705/39 |
| 2006/0005254 A1 | 1/2006 | Ross | |
| 2006/0212556 A1* | 9/2006 | Yacoby | H04L 41/0893 |
| | | | 709/223 |
| 2011/0078439 A1* | 3/2011 | Mao | H04L 63/126 |
| | | | 713/156 |
| 2012/0324225 A1 | 12/2012 | Chambers et al. | |
| 2013/0081101 A1 | 3/2013 | Baer et al. | |
| 2015/0074746 A1 | 3/2015 | Kohno et al. | |
| 2015/0161378 A1 | 6/2015 | Oberheide et al. | |
| 2016/0099969 A1 | 4/2016 | Angus et al. | |
| 2016/0112436 A1* | 4/2016 | Kopp | H04L 41/0809 |
| | | | 726/1 |
| 2017/0078283 A1* | 3/2017 | Unagami | H04L 9/14 |

* cited by examiner

ENDPOINT ACCESS MANAGER

BACKGROUND

The present invention relates generally to the field of computer network security, and more particularly to network access.

Computer security, also known as cyber security or IT security, is the protection of computer systems from the theft or damage to their hardware, software, or information, as well as from disruption or misdirection of the services they provide. Cyber security includes controlling physical access to the hardware, as well as protecting against harm that may come via network access, data, and code injection. Also, due to malpractice by operators, whether intentional or accidental, IT security is susceptible to being tricked into deviating from secure procedures. The field is of growing importance due to the increasing reliance on computer systems and the Internet in most societies; wireless networks, such as Bluetooth and Wi-Fi and the growth of "smart" devices, including smartphones, televisions, and tiny devices as part of the Internet of Things.

Endpoint security is a technology that takes an upper hand to protect computer networks that are remotely bridged to users' devices. The use of laptops, tablets, mobile devices, and other wireless gadgets connected with corporate networks creates vulnerability paths for security threats. Endpoint security attempts to ensure that such devices follow a definite level of compliance and standards. Endpoint security is the process of securing the various endpoints on a network, often defined as end-user devices, such as mobile devices, laptops, and desktop PCs, although hardware, such as servers in a data center, are also considered endpoints.

By requiring endpoint devices to meet security standards prior to being granted network access, enterprises can maintain greater control over the ever-growing number of access points and more effectively block threats and access attempts prior to entry. Beyond simply controlling access, endpoint security tools also provide capabilities, such as monitoring for and blocking risky or malicious activities. What differentiates endpoint security from the well-known anti-virus software is that within the endpoint security framework, endpoints bear some or all responsibility for their own security. This is in contrast to network security, in which security measures encompass the network as a whole rather than individual devices and servers.

SUMMARY

According to one embodiment of the present invention, a method for determining whether an endpoint meets compliance standards is provided. The method for determining whether an endpoint meets compliance standards may include one or more processors receiving an endpoint certificate associated with an endpoint device that is requesting to access a resource, wherein the endpoint certificate includes a device fingerprint. The method further includes one or more processors determining compliance level of the endpoint device. The method further includes one or more processors validating credentials of the endpoint device. The method further includes one or more processors determining whether the endpoint device meets compliance standards based on the endpoint certificate, the determined compliance level, and the credentials of the endpoint device.

DETAILED DESCRIPTION

Embodiments of the present invention allow for a method of automatically identifying non-compliant endpoint devices and disallowing access to protected resources for non-compliant endpoint devices.

Embodiments of the present invention recognize that current web authentication methods to access protected resources are unable to verify the state of the endpoint where the request originated. The state of the endpoint includes information indicating compliance, regulatory rules, and organization policies. Current methods of web authentication also lack integration between compliance and access control.

Embodiments of the present invention provide integration between authentication and access control with compliance of the endpoint, and the current invention provides seamless integration with existing web clients. The current invention provides the ability to link devices and user identity before granting access to a protected resource while permitting compliance approval workflows for exceptions resulting from a failed compliance check.

Figure 1:
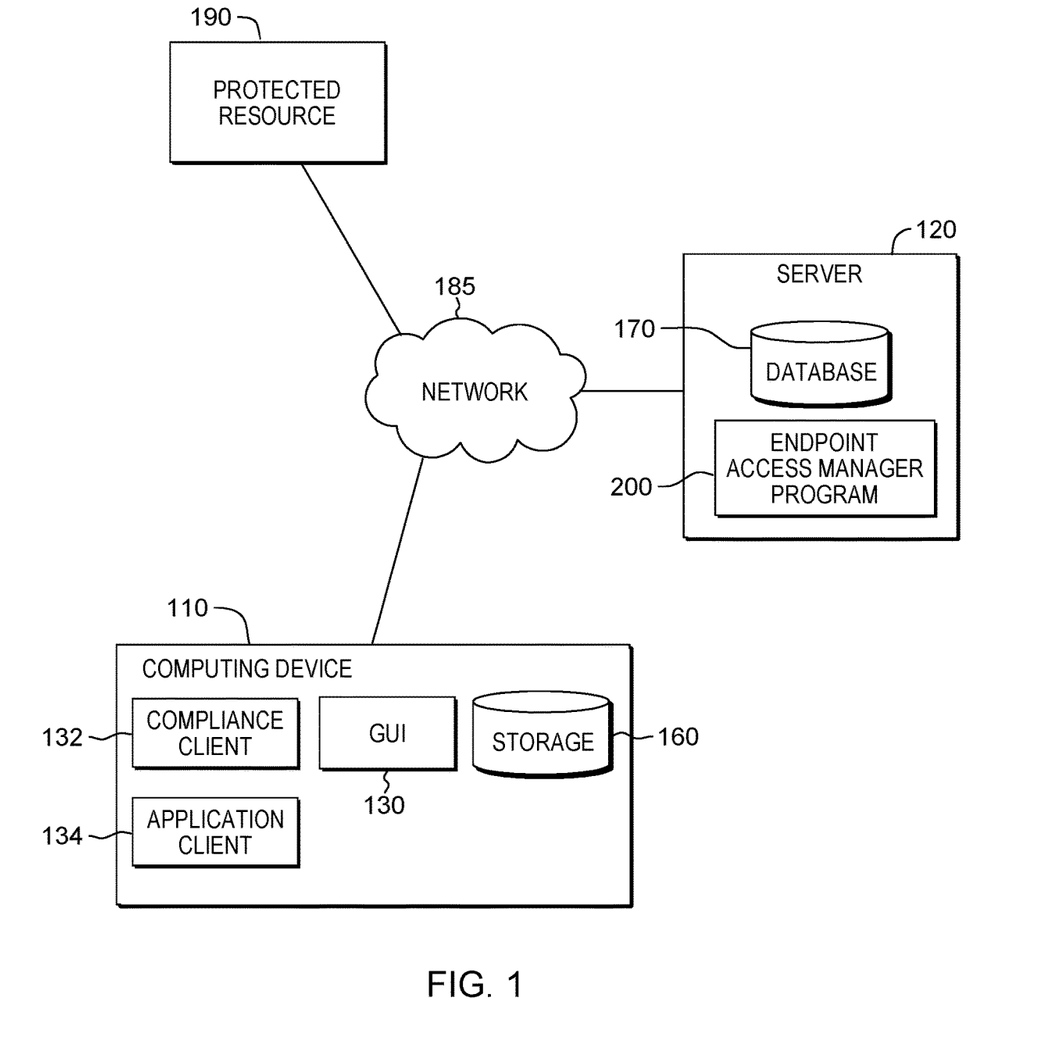
FIG. 1 is a functional block diagram illustrating a distributed data processing environment, in accordance with an embodiment of the present invention.

Example embodiments, in accordance with the present invention, will now be described in detail with reference to the Figures. FIG. 1 is a functional block diagram. Distributed data processing environment 100 includes computing device 110 and server 120, and protected resource 190 interconnected over network 185.

In one embodiment, computing device 110 includes graphical user interface (GUI) 130, compliance client 132, application client 134, and storage 160. The various programs on computing device 110 include a web browser, an electronic mail client, security software (e.g., a firewall program, a geo-locating program, an encryption program, etc.), an instant messaging (IM) application (app), and a communication (e.g., phone) application.

Computing device 110 may be a desktop computer, a laptop computer, a tablet computer, a specialized computer server, a smartphone, a wearable device (e.g., smart watch, personal fitness device, personal safety device), or any programmable computer system known in the art with an interactive display or any other computer system known in the art. In certain embodiments, computing device 110 represents a computer system utilizing clustered computers and components that act as a single pool of seamless resources when accessed through network 185, as is common in data centers and with cloud computing applications. In general, computing device 110 is representative of any programmable electronic device or combination of programmable electronic devices capable of executing machine-readable program instructions and communicating with other computer devices via a network.

In one embodiment, graphical user interface 130 operates on computing device 110. In another embodiment, graphical user interface 130 operates on another computer in a server based setting; for example, on a server computer (e.g., server 120). In yet another embodiment, graphical user interface 130 operates on computing device 110 simultaneously with a server computer interconnected through network 185.

Graphical user interface 130 may be any user interface used to access information from computing device 110, such as information gathered or produced by endpoint access manager program 200. Additionally, graphical user interface 130 may be any user interface used to supply information to computing device 110, such as information supplied by a user to be used by endpoint access manager program 200. In some embodiments, graphical user interface 130 may present a generic web browser used to retrieve, present, and negotiate resources from the Internet. In other embodiments, graphical user interface 130 may be a software or application that enables a user at computing device 110 access to network 185.

In yet another embodiment, a user of computing device 110 can interact with graphical user interface 130 through a touch screen that performs as both an input device to a graphical user interface (GUI) and as an output device (i.e., an electronic display) presenting a plurality of icons associated with software applications or images depicting the executing software application. Optionally, a software application (e.g., a web browser) can generate graphical user interface 130 operating within the GUI of computing device 110. Graphical user interface 130 accepts input from a plurality of input/output (I/O) devices including, but not limited to, a tactile sensor interface (e.g., a touch screen or a touchpad) referred to as a multi-touch display. An I/O device interfacing with graphical user interface 130 may be connected to computing device 110, which may operate utilizing wired (e.g., USB port) or wireless network communications (e.g., infrared, NFC, etc.). Computing device 110 may include components, as depicted and described in further detail with respect to FIG. 3, in accordance with embodiments of the present invention.

Compliance client 132 is a program located on computing device 110 that ensures that computing device 110 is in full compliance with security policies and best-practice standards when accessing enterprise networks through sending data about the computing device to an endpoint compliance server on a periodic basis. Compliance client 132 assists in validating the compliance level of the computing device by installing a certificate into application client 134.

In an embodiment, compliance client 132 ensures compliance with provider security policies by enabling network access control software (e.g., VPN clients, firewalls, etc.) to quarantine a computing device. In an example, compliance client 132 collects information from a computing device (e.g., computing device 110) and creates a device fingerprint that is embedded in the client certificate. A device fingerprint includes the unique information, IP address, hostname, media access control address (MAC address), and international mobile equipment identity numbers (IMEI) for mobile devices collected by compliance client 132. In another example, compliance client 132 enables network admission control frameworks and technologies to quarantine the computer based on compliance evaluation results conducted by endpoint access manager program 200.

In another embodiment, compliance client 132 is capable of directing the provider security policy through checking that the computing device has all the latest patches that are required by company/provider policy. In another embodiment, compliance client 132 is capable of directing the provider security policy through checking that all the security policies are in place and there are no security vulnerabilities (weak passwords, open shares, unauthorized USB/wireless devices, insecure settings, etc.).

Application client 134 is a program located on computing device 110 that performs tasks, such as system or application administration. Application client 134 is connected with strong enterprise components (e.g., Web services or web browser services), which are deployed in a remote application server. In an embodiment, application client 134 functions as a web browser used to retrieve, present, and traverse information resources from the Internet. In some embodiments, application client 134 may be a web browser designed for a mobile device. In other embodiments, application client 134 may be a web browser designed for a traditional computing device, such as a desktop computer, PC, or laptop. In general, application client 134 may be any application or software that enables a user of computing device 110 to access a webpage over network 185. In the depicted environment, application client 134 resides on computing device 110. In other embodiments, application client 134 or similar web browsers, may reside on other computing devices capable of accessing a webpage over network 185.

Storage 160, a database, located on computing device 110, represents any type of storage device capable of storing data that is accessed and utilized by computing device 110. In other embodiments, storage 160 represents multiple storage devices within computing device 110. Storage 160 stores information, such as, but not limited to, user profiles, account information, credentials for authentication, user preferences, lists of preferred users, previously visited websites, history of visited Wi-Fi portals, and the history of the location of the computing device.

Protected resource 190, connected to network 185, is a system that is managed by endpoint access manager program 200. In an embodiment, protected resource 190 is registered for use by an employee of an organization. In an example, protected resource 190 is a web application that contains patients' identity information in a hospital setting. In another example, protected resource 190 is payroll information in a human resource system. In yet another example, protected resource 190 is account information for a bank.

In general, network 185 can be any combination of connections and protocols that will support communications among computing device 110. Network 185 can include, for example, a local area network (LAN), a wide area network (WAN), such as the Internet, a cellular network, or any combination of the preceding, and can further include wired, wireless, and/or fiber optic connections.

Server 120 may be a desktop computer, a laptop computer, a tablet computer, a specialized computer server, a smartphone, or any other computer system known in the art. In certain embodiments, server 120 represents a computer system utilizing clustered computers and components that act as a single pool of seamless resources when accessed through network 185, as is common in data centers and with cloud computing applications. In general, server 120 is representative of any programmable electronic device or combination of programmable electronic devices capable of executing machine-readable program instructions and communicating with other computer devices via a network. In one embodiment, server 120 includes endpoint access manager program 200 and database 170.

In an embodiment, server 120 functions as an endpoint compliance server. In an example, server 120 functions as an endpoint compliance server and acts as a certificate authority that signs the compliance client certificate generated by compliance client 132. Server 120 signs the certificate signed, while functioning as endpoint compliance server and certificate authority, and the certificate expires according to provider policy. The certificate includes information identifying the endpoint or computing device, and the user to which the endpoint belongs (e.g., via a reference to storage 160).

Database 170 may be a repository that may be read by endpoint access manager program 200. In an example embodiment, database 170 can store data relevant to the device fingerprint and information, such as certificates from compliance client 132, and other information. In some embodiments, database 170 may access and retrieve information from compliance client 132, such as certificate expiration dates. In other embodiments, a program on server 120 (not shown) may prompt and update database 170 with information. The data stored to database 170 may be changed or updated by data input by a user, such as a user with access to server 120. In one embodiment, database 170 resides on server 120. In other embodiments, database 170 may reside on another server, another computing device, or mobile device, provided that database 170 is accessible to endpoint access manager program 200. Database 170 operates to enhance endpoint access manager program 200 by increasing the accuracy or amount of data available to endpoint access manager program 200.

Endpoint access manager program 200 operates on server 120. Endpoint access manager program 200 provides the capability to automatically identify non-compliant endpoint devices and deny access to protected resources. Endpoint access manager program 200 manages computing device, and user access, to protected resource 190.

In one embodiment, endpoint access manager program 200 checks the compliance of a computing device or system automatically as part of the authentication workflow previously discussed as a function of compliance client 132. Endpoint access manager program 200 validates the authenticated user is an approved user of the client system requesting a protected resource and endpoint access manager program 200 is capable of redressing non-compliant users or devices to permit access to a protected resource in a real-time approval process.

Endpoint access manager program 200 is capable of utilizing Wi-Fi technology, Bluetooth, Near Field Communication tags (NFC), Global System for Mobile Communications (GSM), and Global Positioning System Technology (GPS) to communicate with the computing device of a user (e.g., computing device 110).

In one embodiment, endpoint access manager program 200 collects the device fingerprint of a computing device, or endpoint, in the same manner as compliance client 132 collects the device fingerprint. The common set of fingerprints collected by endpoint access manager program 200 and compliance client 132 aid in confirming the identity of the endpoint.

Figure 2:
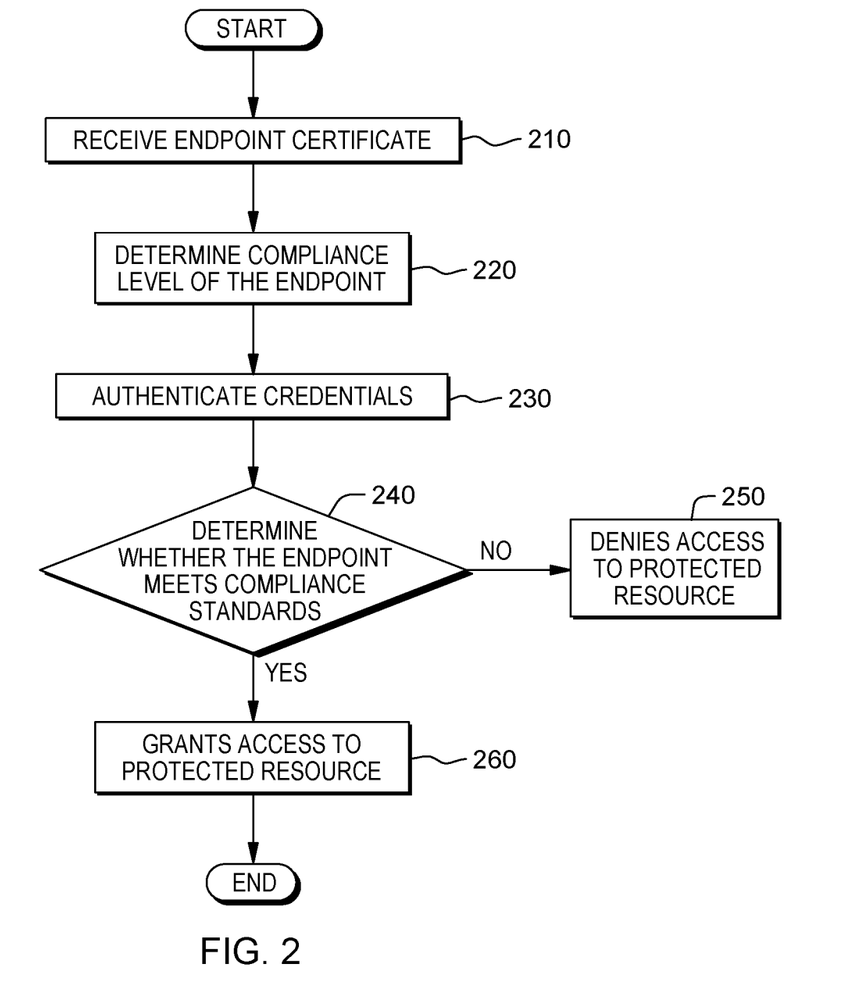
FIG. 2 is a flowchart depicting operational steps of a program for automatically identifying non-compliant endpoint devices and denying access to protected resources, in accordance with the present invention.

FIG. 2 is a flowchart depicting the operational steps of endpoint manager access program 200, in accordance with an embodiment of the present invention.

In step 210, endpoint manager access program 200 receives an endpoint certificate. In an embodiment, compliance client 132 sends a certificate signing request, along with sending the endpoint certificate, to server 120. In an example, the endpoint certificate identifies computing device 110 and the user to which the computing device 110 belongs. The endpoint certificate also contains a device fingerprint that is unique to a respective endpoint, and the endpoint certificate contains the compliance level of the endpoint. In this example, compliance client 132 collects information from computing device 110 and creates a device fingerprint. Compliance client 132 requests server 120 to sign a certificate (e.g., via a certificate signing request), with the device fingerprint embedded in the certificate in a unique field. Compliance client 132 also sends data to server 120 related to computing device 110.

In step 220, endpoint manager access program 200 determines the compliance level of the endpoint. In an embodiment, endpoint manager access program 200 can act as a certificate authority and sign the certificate for compliance client 132. Endpoint access manager program 200 accesses an endpoint compliance policy stored on database 170, located on server 120, to determine and calculate the compliance level of the endpoint device. In an example, endpoint access manager program 200 determines the endpoint compliance level of computing device 110 is high or medium. Endpoint access manager program 200 adds the device fingerprint and the device compliance level as certificate extensions. In this example, endpoint access manager program 200 determines that the compliance level is medium and sends the signed certificate back to compliance client 132. Compliance client 132 receives the certificate and installs the certificate into application client 134 on computing device 110. The endpoint certificate, signed by server 120, expires according to an endpoint compliance policy of server 120. In another embodiment, compliance client 132 stores the certificate on computing device 110. In this example, endpoint access manager program 200 stores the certificate in storage 160, on computing device 110, so that the certificate is accessible during a flow where the user needs to present the certificate manually.

In another embodiment, Cardholder Data Environments (CDEs) are network environments that store, process, and transmit credit card data. CDEs operate as a function of how the organization establishes the wireless local area networks access point (WLAN AP) outside the cardholder data network or inside the cardholder data network. In this example, computing device 110 is an endpoint device for an organization with a known WLAN AP inside the CDE. In this example, endpoint access manager program 200 determines that computing device 110 has achieved the proper compliance standard because computing device 110 has, on the device, four out of six required organizational safeguards. Computing device 110 has 1) Aps that are set up WPA (Wi-Fi Protected Access) or WPA2 (Wi-Fi Protected Access II) mode with 802.1X authentication Extensible Authentication Protocol) and Advanced Encryption Standard (AES encryption), 2) restricted physical access to known wireless devices, 3) contains a wireless log archive using wireless intrusion prevention system (WIPS) for a year, and 4) is subject to review of wireless access logs daily.

In another embodiment, endpoint access manager program 200 determines that the compliance level of computing device 110 does not meet administrative policy standards. Endpoint access manager program 200 determines that computing device 110 is not compliant with the administrative policy standards. In this example, endpoint access manager program 200 determines that computing device 110 does not have one of the minimum scanning requirements for wireless local access networks (WLAN). The minimum scanning requirements apply to all organizations regardless of the type of wireless LAN deployment in the cardholder data environment. Endpoint access manager program 200 determines that computing device 110 does not have a monitor alert that enables automatic wireless intrusion prevention system (WIPS) alerts to instantly notify personnel of rogue devices and unauthorized wireless connections into the cardholder data environment. In this example, server 120 does not sign the compliance certificate, and application client 134 does not receive a signed compliance certificate from server 120.

In step 230, endpoint access manager program 200 authenticates credentials. In an embodiment, a user utilizes application client 134 to access protected resource 190. Endpoint access manager program 200 requires the client certificate (generated in step 210) and user credentials to authenticate a credential. In an example, application client 134 automatically presents the certificate to endpoint access manager program 200 because compliance client 132 installed the certificate via application client 134 on computing device 110 (in step 210). In this example, a user manually enters the user's credentials for verification by endpoint access manager program 200. In an example scenario, a user's credentials are a service set identifier (SSID) and password.

In another embodiment, the user manually presents the certificate generated by server 120, in step 210. In an example, server 120 generated the certificate but did not install the certificate on application client 134. In this example, the user manually sends and stores the certificate to storage 160 and manually enters the user's credentials.

In decision step 240, endpoint access manager program 200 determines whether the endpoint meets compliance standards. In an embodiment, endpoint access manager program 200 determines whether the endpoint meets compliance standards by comparing the device fingerprint available, on the received certificate, with a device fingerprint that endpoint access manager program 200 generates. In addition, endpoint access manager program 200 determines whether the endpoint meets compliance standards by authenticating user credentials in step 230. Endpoint access manager program 200 generates a device fingerprint for the endpoint (e.g., computing device 110) from which the user is requesting access to protected resource 190. In this example, endpoint access manager program 200 compares the generated device fingerprint of computing device 110 with the device fingerprint available on the received certificate (in step 210). In an example embodiment, if any of the comparisons fail (decision step 240, "no" branch), then endpoint access manager program 200 denies access to protected resource 190 (step 250).

In another embodiment, endpoint access manager program 200 evaluates a policy, enacted by an organization, associated with protected resource 190, in determining a standard for compliant client access or non-compliant client access. In an example, endpoint access manager program 200 can analyze an organizations' policy to extract the compliance level determined in step 220 from the certificate generated in step 210. If the compliance level meets the organizations' standard, then endpoint access manager program 200 can grant the user access to protected resource 190 despite being non-compliant in another manner. For example, a user may provide adequate SSID credentials, but endpoint access manager program 200 determines that the device fingerprint between the certificate received in step 210 and the device fingerprint that endpoint access manager program 200 generates based on the endpoint, are not identical.

In another embodiment, endpoint access manager program 200 is capable of permitting or denying access to certain resources based on compliance level in real time. Different users can use the same endpoint, or computing device to access a protected resource. In this example, the organizational policy dictates a strong authentication from the user accessing the resource. A strong authorization could be management credentials or other high-level authorization. In yet another embodiment, endpoint access manager program 200 may determine that a resource being accessed contains no sensitive data and can allow a user with a security compliance level above a certain threshold access to protected resource 190 despite the user being otherwise non-compliant.

In step 250, endpoint access manager program 200 denies access to protected resource. More specifically, in response to determining that the endpoint does not meet compliance standards (decision step 240, "no" branch), endpoint access manager program 200 denies access to the protected resource. In an example, as shown in step 220, endpoint access manager program 200 determines that an organization has deployed WLAN APs outside the CDE. Endpoint access manager program 200 determines that the WLAN AP, from the endpoint device seeking access to a protected resource, is segmented from the CDE by a firewall. Endpoint access manager program 200 accesses database 170 to retrieve the compliance standards. Endpoint access manager program accesses the minimum compliance standards for wireless LAN from database 170. The three minimum compliance standards, from database 170, are: a 1) quarterly wireless scan of all sites with CDEs whether or not they have known WLAN APs in the CDE, 2) to monitor alerts through enabling automatic WIPS alerts to instantly notify personnel of rogue devices and unauthorized wireless connections into the CDE, and 3) to eliminate threats by preparing an incident response plan to monitor and respond to alerts from the WIPS. The compliance standard requires that the endpoint device enable automatic containment mechanisms on WIPS to block rogues and unauthorized wireless connections.

In this example, endpoint access manager program 200 determines whether the endpoint contains all three of the minimum compliance standards. The endpoint device contains two of the three required compliance standards. Endpoint access manager program 200 denies access to the CDE after determining that the endpoint device does not meet the compliance standards.

In step 260, endpoint access manager program 200 grants access to protected resource. More specifically, in response to determining that the endpoint does meet compliance standards (decision step 240, "yes" branch), endpoint access manager program 200 grants access to the protected resource. In an example embodiment, endpoint access manager program 200 verifies the SSID user credentials and determines that the device fingerprint that endpoint access manager program 200 generated for the endpoint (e.g., computing device 110) and the device fingerprint available from the certificate received in step 210 are identical. In this embodiment, endpoint access manager program 200 determines that the endpoint does meet compliance standards and grants the user access to protected resource 190.

In another embodiment, endpoint access manager program 200 grants access to protected resource 190 based upon endpoint access manager program 200 verifying the SSID user credentials and determining that the device fingerprint that endpoint access manager program 200 generated for the endpoint, computing device 110, and the device fingerprint available from the certificate generated in step 210 are identical. In this example, endpoint access manager program 200 does not require an authenticated SSID credential.

In another embodiment, endpoint access manager program 200 permits access to protected resource 190 with the user verifying identification based on a fingerprint scan authentication. In this example, endpoint access manager program 200 does not require that the device fingerprint that endpoint access manager program 200 generated for the endpoint, computing device 110, and the device fingerprint available from the certificate generated in step 210 are identical.

In another embodiment, endpoint access manager program 200 grants access to protected resource 190 without authenticating the user credentials or analyzing the device fingerprints. In this example, endpoint access manager program 200 allows the user access to protected resource 190 because endpoint access manager program 200 determines that protected resource 190, which contained sensitive material, no longer contains sensitive material. For example, endpoint access manager program 200 determines that after a threshold date, information that was sensitive prior to that date is now publically available information and does not require high-level authorization.

In another embodiment, endpoint access manager program 200 determines whether an endpoint meets compliance standards for a CDE. Contrary to the outcome in step 250, endpoint access manager program 200 determines that the endpoint device contains all three of the scanning requirement for wireless LAN. Endpoint access manager program 200 grants access to the CDE because the endpoint access manager program 200 determines that the compliance standards have been met.

Figure 3:
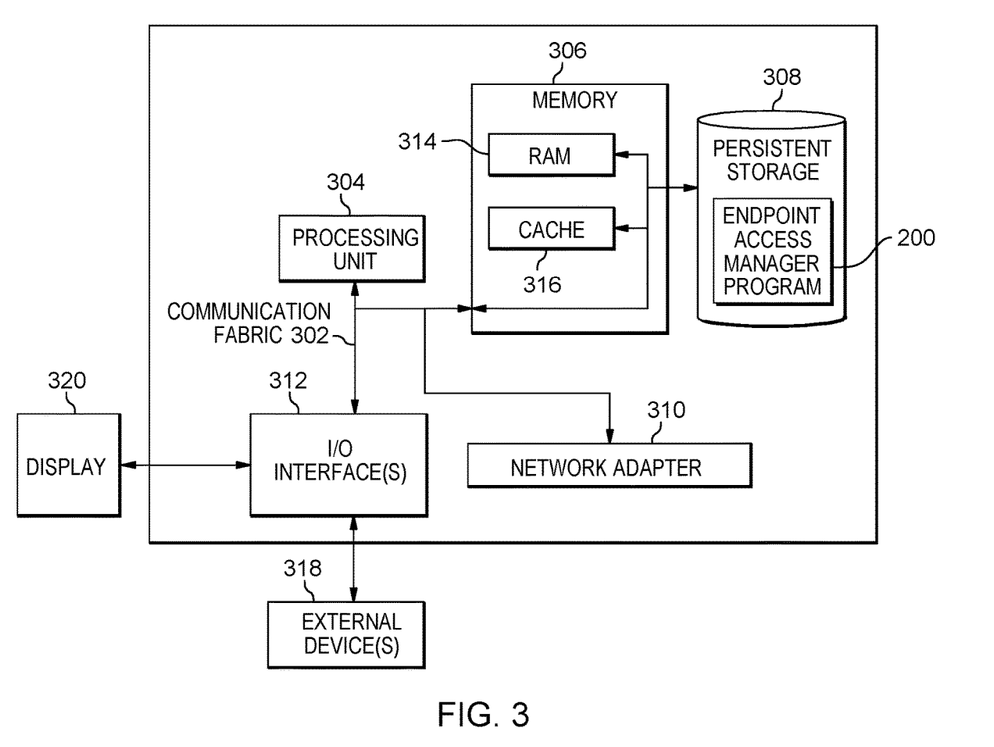
FIG. 3 is a block diagram of components of a computer system, such as the server computer of FIG. 1, in accordance with an embodiment of the present invention.

FIG. 3 depicts a block diagram of components of server computer 120 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server 120 includes communication fabric 302, which provides communications between cache 316, memory 306, persistent storage 308, network adapter 310, and input/output (I/O) interface(s) 312. Communication fabric 302 can be implemented with any architecture designed for passing data and/or control information between processors (such as microprocessors, communications and network processors, etc.), system memory, peripheral devices, and any other hardware components within a system. For example, communication fabric 302 can be implemented with one or more buses or a crossbar switch.

Memory 306 and persistent storage 308 are computer readable storage media. In this embodiment, memory 306 includes random access memory (RAM) 314. In general, memory 306 can include any suitable volatile or non-volatile computer readable storage media. Cache 316 is a fast memory that enhances the performance of processing unit 304 by holding recently accessed data, and data near accessed data, from memory 306.

Endpoint access manager program 200 may be stored in persistent storage 308 and in memory 306 for execution by one or more of the respective processing unit 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Network adapter 310, in these examples, provides for communications with other data processing systems or devices. In these examples, network adapter 310 includes one or more network interface card. Network adapter 310 may provide communications through the use of either or both physical and wireless communications links. Endpoint access manager program 200 may be downloaded to persistent storage 308 through network adapter 310.

I/O interface(s) 312 allows for input and output of data with other devices that may be connected to server 120. For example, I/O interface(s) 312 may provide a connection to external device(s) 318, such as a keyboard, keypad, a touch screen, and/or some other suitable input device. External device(s) 318 can also include portable computer readable storage media, such as, for example, thumb drives, portable optical or magnetic disks, and memory cards. Software and data used to practice embodiments of the present invention, e.g., endpoint access manager program 200, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining whether an endpoint meets compliance standards, the method comprising:
    receiving, by one or more processors, an endpoint certificate associated with an endpoint device that is requesting to access a resource, wherein the endpoint certificate includes a device fingerprint;
    determining, by one or more processors, a network that the endpoint device is utilizing to request access to the resource;
    identifying, by one or more processors, at least one deployment requirement dictated by the network;
    determining, by one or more processes, compliance level of the endpoint device;
    validating, by one or more processors, credentials of the endpoint device;
    determining by one or more processors, that the endpoint device does not meet compliance standards based on the endpoint certificate, the determined compliance level, and the credentials of the endpoint device; and
    denying, by one or more processors, the endpoint device access to the resource.

2. The method of claim 1, wherein determining the compliance level of the endpoint device further comprises:
    accessing, by one or more processors, a database to retrieve a compliance standard;

identifying, by one or more processors, at least one deployment requirement dictated by the compliance standard;

determining, by one or more processors, an amount of the identified at least one deployment requirements that the endpoint device meets based on the received endpoint certificate and information associated with the endpoint device; and determining, by one or more processors, the compliance level of the endpoint device based on the determined amount of the identified at least one deployment requirements that the endpoint device meets.

3. The method of claim 1, wherein validating credentials for the endpoint device further comprises:

identifying, by one or more processors, a user of the endpoint device; and determining, by one or more processors, whether the user is an approved user of the endpoint device.

4. The method of claim 1, further comprising:

receiving, by one or more processors, a second endpoint certificate associated with the endpoint device that is requesting access to a second resource;

determining, by one or more processors, that the second resource is publically available; and granting, by one or more processors, the endpoint device access to the second resource.

5. A computer program product for determining whether an endpoint meets compliance standards, the computer program product comprising:

one or more computer readable tangible storage media and program instructions stored on at least one of the one or more computer readable storage media, the program instructions readable/executable by one or more computer processors and further comprising:

program instructions to receive an endpoint certificate associated with an endpoint device that is requesting to access a resource, wherein the endpoint certificate includes a device fingerprint;

program instructions to determine a network that the endpoint device is utilizing to request access to the resource;

program instructions to identify at least one deployment requirement dictated by the network;

program instructions to determine compliance level of the endpoint device;

program instructions to validate credentials of the endpoint device;

program instructions to determine that the endpoint device does not meet compliance standards based on the endpoint certificate, the determined compliance level, and the credentials of the endpoint device: and program instructions to deny the endpoint device access to the resource.

6. The computer program product of claim 5 wherein determining the compliance level of the endpoint device further comprises program instructions, stored on the one or more computer readable storage media, which when executed by a processor, cause the processor to:

access a database to retrieve a compliance standard;

identify at least one deployment requirement dictated by the compliance standard;

determine an amount of the identified, at least one deployment requirements that the endpoint device meets based on the received endpoint certificate and information associated with the endpoint device; and determine the compliance level of the endpoint device based on the determined amount of the identified at least one deployment requirements that the endpoint device meets.

7. The computer program product of claim 5 wherein validating credentials for the endpoint device further comprises program instructions, stored on the one or more computer readable storage media, which when executed by a processor, cause the processor to:

identify a user of the endpoint device; and determine whether the user is an approved user of the endpoint device.

8. The computer program product of claim 5, further comprising program instructions, stored on the one or more computer readable storage media, which when executed by a processor, cause the processor to:

receive a second endpoint certificate associated with the endpoint device that is requesting access to a second resource;

determine that the second resource is publically available; and grant the endpoint device access to the second resource.

9. A computer system comprising:

one or more computer processors;

one or more computer readable storage media; and program instructions stored on the computer readable storage media for execution by at least one of the one or more computer processors, the program instructions comprising:

program instructions to receive an endpoint certificate associated with an endpoint device that is requesting to access a resource, wherein the endpoint certificate includes a device fingerprint;

program instructions to determine a network that the endpoint device is utilizing to request access to the resource;

program instructions to identify at least one deployment requirement dictated by the network;

program instructions to determine compliance level of the endpoint device;

program instructions to validate credentials of the endpoint device;

program instructions to determine that the endpoint device does not meet compliance standards based on the endpoint certificate, the determined compliance level, and the credentials of the endpoint device; and program instructions to deny the endpoint device access to the resource.

10. The computer system of claim 9, wherein determining the compliance level of the endpoint device further comprises program instructions, stored on the one or more computer readable storage media, which when executed by a processor, cause the processor to:

program instructions to access a database to retrieve a compliance standard;

program instructions to identify at least one deployment requirement dictated by the compliance standard;

program instructions to determine an amount of the identified at least one deployment requirements that the endpoint device meets based on the received endpoint certificate and information associated with the endpoint device; and program instructions to determine the compliance level of the endpoint device based on the determined amount of the identified at least one deployment requirements that the endpoint device meets.

11. The computer system of claim 9 wherein validating credentials for the endpoint device further comprises program instructions, stored on the one or more computer readable storage media, which when executed by a processor, cause the processor to:
   identify a user of the endpoint device; and
   determines whether the user is an approved user of the endpoint device.

12. The computer system of claim 9, further comprising program instructions, stored on the one or more computer readable storage media, which when executed by a processor, cause the processor to:
   receive a second endpoint certificate associated with the endpoint device that is requesting access to a second resource;
   determine that the second resource is publically available; and
   grant the endpoint device access to the second resource.

* * * * *

UNITED STATES PATENT AND TRADEMARK OFFICE
CERTIFICATE OF CORRECTION

Page 1 of 1

PATENT NO. : 10,581,861 B2
APPLICATION NO. : 15/701564
DATED : March 3, 2020
INVENTOR(S) : Yunfei Bai et al.

It is certified that error appears in the above-identified patent and that said Letters Patent is hereby corrected as shown below:

On the Title Page

Item (72), Inventor:
'Guoguang Jason Lu'

Should read:
--Guoguang Jason Lui--

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*